April 2, 1963 N. MARCHANT 3,083,456
SHEARING TOOL
Filed Aug. 9, 1960
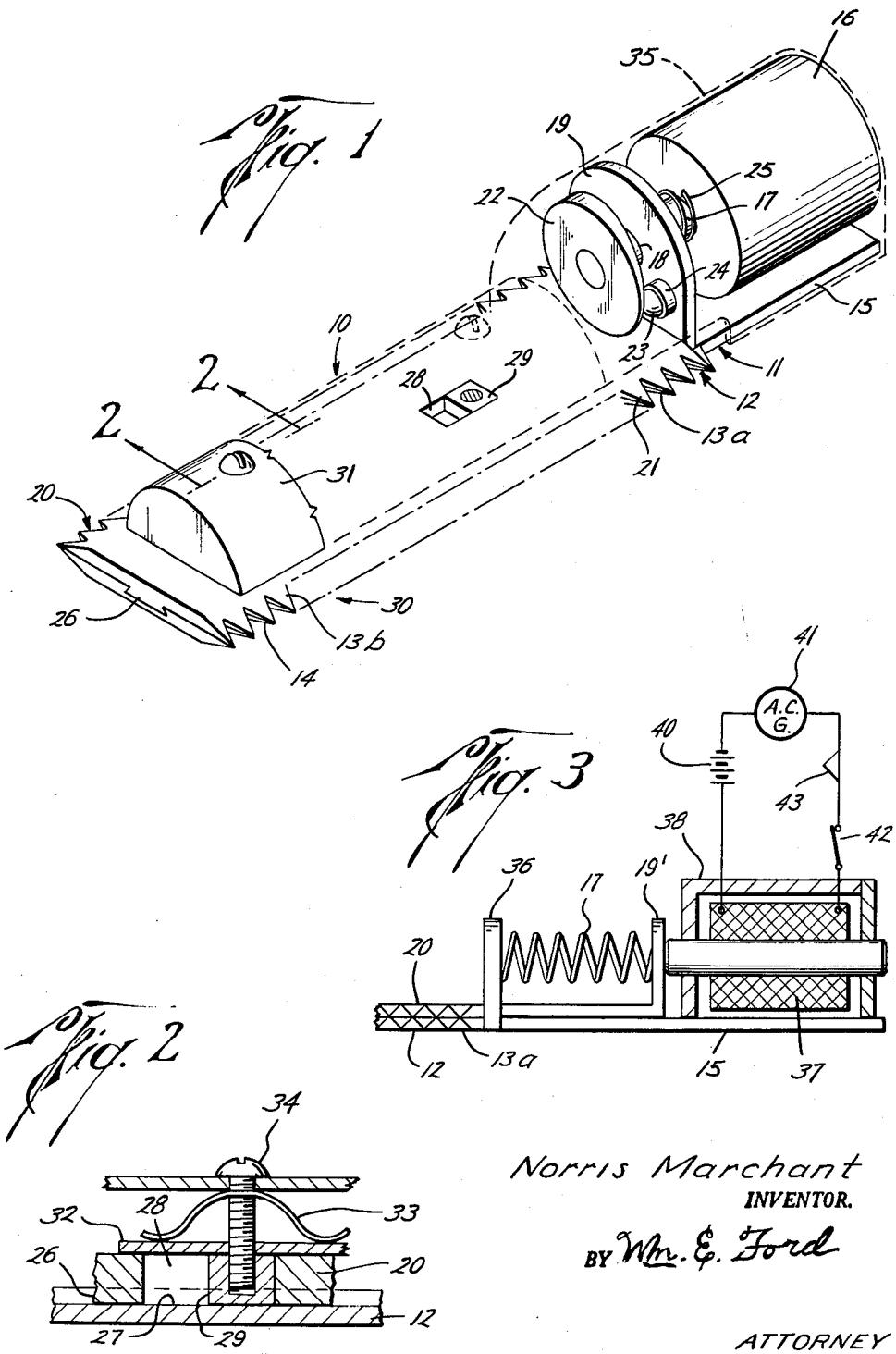
Norris Marchant
INVENTOR.
BY Wm. E. Ford
ATTORNEY 3,083,456
SHEARING TOOL
Norris Marchant, 883 Homewood Lane, Houston, Tex.
Filed Aug. 9, 1960, Ser. No. 48,406
4 Claims. (Cl. 30—210)

This invention relates to a shearing tool which oscillates a movable blade over a fixed blade so that the teeth of the movable blade pass over the teeth of the fixed blade and shear filaments or stalks such as hair, between the teeth, the tool being constructed to compensate for wear between the relatively movable elements so that the tool will cut effectively regardless of whether or not there occurs relative wear between the working parts thereof.

The invention is especially adapted for cutting hair in a manner that the elevation of the cut off hairs may be all in the same plane, as in the horizontal plane, as in the style of haircuts presently known as "crewcut" haircuts, but the invention has other adaptations as well, as in shearing animals such as sheep or goats, or the invention may also be adapted to shears for other than cutting hair, as for instance for cutting grass.

It is a primary object of the invention thus to provide a cutting or shearing tool adapted to cut filaments or stalks, such as hair, so that the ends thereof upstand in substantially the same plane, as in the horizontal plane, the tool being constructed to compensate for wear between the parts so that the tool may continue operating effectively even though considerable wear may occur.

It is also an object of this invention to provide a cutting or shearing tool of this class which shears effectively at a fast reciprocatory rate and which provides resilient means to compensate for wear between the parts.

It is a further object of this invention to provide a shearing tool of this class which translates the rotary motion of an alternating current driven motor into reciprocatory motion, or which may translate alternating current power into the reciprocatory motion of a direct current actuated solenoid to obtain the fastest rate of reciprocation, as by the use of a selenium rectifier.

Other and further objects will be apparent when the specification herein is considered in connection with the drawings in which:

FIG. 1 is an isometric view of one embodiment of the invention;

FIG. 2 is a fragmentary sectional view showing the details of the guiding apparatus which permits relative blade movement; and FIG. 3 is a view, partially diagrammatic, showing another embodiment of the invention, as actuated by a solenoid.

Referring now in detail to the drawings in which like reference numerals refer to like elements in the various views, a shearing tool 10 is shown in FIG. 1 having a base member 11 which includes forwardly a fixed blade 12 having serrations or teeth 13a formed in the opposed longitudinally extending edges or side faces 14 thereof. Rearwardly the base member 11 includes a base portion 15 which supports a motor 16 thereon which may be a fractional horsepower motor plugged into a source of electrical power, or which may be a mechanical, hydraulic, or manually operated motor. Whatever motor means which may be employed rotates a shaft 17 which extends from the motor 16 through a bore or bearing 18 in a bracket 19 which upstands from the rear portion of a movable blade 20 which overextends the fixed blade 12 and has serrations or teeth 13b formed in the opposed longitudinally extending edges or side faces thereof.

The shaft 17 has a cam 22 on its forward end spaced from the forward face of the bracket 19, the cam being of gradually and uniformly increasing thickness as measured with reference to the longitudinal axis of the tool, varying from a minimum width to a maximum width at a point spaced 180° therefrom. An anti-friction means, as a ball bearing 23 is housed in a suitable hollow extension or protrusion 24 on the forward face of the bracket 19 to space the cam face of the cam from contact with the bracket forward surface. Such ball bearing 23 may be spring urged forwardly, as an option of construction not shown.

Between the bracket 19 and the forward face of the motor 16 a resilient means, as a spring 25, extends about the shaft 17 and bears forwardly against the rear of the bracket 19 and rearwardly against the forward face of the motor 16. Thus as the shaft 17 may be rotated the spring 25 will constantly urge forwardly the bracket 19 and the movable blade 20 connected thereto, such urging being in opposition to the force of the cam 22 which forces the movable blade rearwardly on a return stroke effected as the cam contact with the ball bearing 23 changes from point of contact with the cam at its thinnest point to point of contact with the cam at its thickest point.

The movable blade 20 is guided with relation to the fixed blade 12 by means of a longitudinally extending way 26 extending from the undersurface thereof which is received in a longitudinally extending groove 27 formed in the upper face of the fixed blade 12 and being of cross-section to receive such way 26 therein. Further guidance is provided by means of longitudinally extending, longitudinally spaced apart slots 28 of rectangular cross-section which extend through the way 26 and receive therein square-headed nuts 29 which are rigidly fixed to the lower blade 12 at the bottom of the way groove 27. The relationship described immediately hereinabove may best be seen when FIG. 1 is considered in connection with FIG. 3.

In order to cover the slots 28 from receiving debris, foreign material or dirt therein, a housing or cover 30 is provided which includes a forward member 31 of arcuate cross-section to fit upon the movable blade 20 and to cover the slots 28 and a hold-down or top guide bar 32 thereover. Spacer spring clips 33 bear upon the spacer bar 32 at the points where it in turn covers the slots 28, and screws 34 extend through the forward cover 31, the spacer clip 33, the hold-down bar 32 and are threadably engaged with the nuts 29 to assemble these elements and in fixed relation to the fixed blade 12 over which the movable blade 20 is reciprocated.

Rearwardly the housing or cover 30 is enlarged to form a hood 35 which extends over the cam 22, shaft 17, spring 25, and bracket 19, and over all or the forward part of the motor 16, as shown.

By this construction the tool has no exposed parts except the cutting teeth 13a and 13b which have to be exposed in order to carry out the purpose of the invention. Also the cutting or movable blade 20 must move over a never changing path as it reciprocates and is held down against the fixed blade by the hold-down construction above the movable blade which is connected to the nuts 29.

A modified embodiment or variation is shown diagrammatically in FIG. 3 in which a bracket 36 is provided on the base just rearwardly of the fixed base teeth 13a, and in which the movable blade teeth 13b begin on the movable blade forwardly of the bracket 36 through which the rear portion of the movable blade extends. A spring 17 bears forwardly against the bracket 36 and rearwardly against the bracket 19' to urge the movable blade 20 rearwardly. A solenoid 37 has its forward end connected to the rear side of the bracket 19' and its ends journalled in a solenoid housing 38 mounted on the base 15. The windings 39 of the solenoid 37 extend insulatedly through the solenoid housing 38 with one end going to one terminal of a direct current battery 40, the other terminal of the battery being connected to an alternating current generation 41. The other end of the solenoid windings 39 extends from the solenoid housing 38 and has in series therewith a switch 42 and an interrupting rectifier 43, such as a selenium rectifier or crystal, such circuit terminating at the other terminal of the generator 41. By this construction the switch 42 may be held closed manually, as by hand pressure on a press bottom in the handle of the tool, and as long as the switch is held closed the solenoid 37 will reciprocate the movable blade 15 in accordance with the high frequency of the rectifier 43.

The cutting teeth or serrations of the blades may be of the conventional shapes as found in barber's clippers and cooperate in like manner. Such conventional teeth arrangement is shown in Patent No. 1,407,748, issued February 28, 1922, to O. Hermann.

The invention is not limited to the forms thereof shown in the hereinabove disclosures but other forms, embodiments and modifications are considered as well as such may fall within the broad spirit of the invention and within the broad scope of interpretation claimed for and merited by the appended claims.

What is claimed is:

1. A shearing tool comprising a fixed blade having a plurality of teeth extending from the opposed side edges of the forward portion thereof and mounting a motor on the rearward portion thereof, said motor including a shaft extending forwardly therefrom with axis of rotation parallel to the longitudinal axis of said fixed blade, a fixed bearing means, a movable blade correspondingly having a plurality of teeth extending from the opposed side edges thereof to pass over the teeth of said fixed blade when reciprocated in direction along the longitudinal axis of said fixed blade, guide means to guide the reciprocation of said movable blade with relation to said fixed blade, a cam on the forward end of said motor shaft and operable by motor shaft rotation to effect reciprocatory motion of said movable blade, a bracket on said movable blade between said cam and said motor, a spring interposed between said bracket and said bearing means and around said shaft to maintain said cam and said movable blade continuously urged into operative contact regardless of relative wear therebetween, and an anti-friction bearing on said bracket against which said cam bears in rotation.

2. A shearing tool as claimed in claim 1 in which said movable blade provides longitudinally extending way means extending from the under surface thereof, and in which said fixed blade provides a longitudinally extending groove in the upper surface thereof of cross-section to slidably receive said way means therein.

3. A shearing tool comprising a fixed blade having a plurality of teeth extending from the opposed side edges of the forward portion thereof and mounting a drive means on the rearward portion thereof with drive means axis of rotation parallel to the longitudinal axis of said fixed blade, a fixed bearing means, a movable blade correspondingly having a plurality of teeth extending over the opposed side edges thereof to pass over the teeth of said fixed blade when reciprocated in direction along the longitudinal axis of said fixed blade, a longitudinally extending, rectangular slot provided in said movable blade and a rectangular nut fixed to said fixed blade and disposed in said slot with relation to which said movable blade guidably reciprocates, a cover over said movable blade affixed with relation to said fixed blade, a guide bar upon said movable blade extending over said slot, a spacer clip spring upon said guide bar and bearing outwardly against the under surface of said cover, and a screw connecting said cover, clip spring, guide bar and nut.

4. A shearing tool as claimed in claim 3 in which said movable blade provides a longitudinally extending way extending from the under surface thereof, and in which said fixed blade provides a longitudinally extending groove in the upper surface thereof of cross-section to slidably receive said way therein.

References Cited in the file of this patent
UNITED STATES PATENTS

| | | |
|---|---|---|
| 1,407,748 | Hermann | Feb. 28, 1922 |
| 1,423,756 | David | July 25, 1922 |
| 1,837,655 | Craft | Dec. 22, 1931 |
| 1,916,731 | Knudsen | July 4, 1933 |
| 2,232,367 | Cherry | Feb. 18, 1941 |
| 2,827,695 | Vitale | Mar. 25, 1958 |